(12) United States Patent
Brian et al.

(10) Patent No.: US 8,867,908 B2
(45) Date of Patent: Oct. 21, 2014

(54) SELF-PROGRAMMING WATER HEATER

(75) Inventors: Joseph Mark Brian, Louisville, KY (US); Michael Thomas Beyerle, Pewee Valley, KY (US); Jay Andrew Broniak, Louisville, KY (US); David C. Bingham, Louisville, KY (US)

(73) Assignee: General Electric Company, Schenectady, NY (US)

( * ) Notice: Subject to any disclaimer, the term of this patent is extended or adjusted under 35 U.S.C. 154(b) by 400 days.

(21) Appl. No.: 13/221,962

(22) Filed: Aug. 31, 2011

(65) Prior Publication Data

US 2013/0051777 A1 Feb. 28, 2013

(51) Int. Cl.
| | |
|---|---|
| H05B 1/02 | (2006.01) |
| F24H 1/18 | (2006.01) |
| F24H 9/20 | (2006.01) |
| F24D 17/00 | (2006.01) |
| F24H 1/20 | (2006.01) |

(52) U.S. Cl.
CPC ............... *F24H 1/20* (2013.01); *H05B 1/0244* (2013.01); *F24H 9/2007* (2013.01)
USPC ........... 392/464; 392/449; 392/463; 219/492; 219/509

(58) Field of Classification Search
None
See application file for complete search history.

(56) References Cited

U.S. PATENT DOCUMENTS

| | | | | | |
|---|---|---|---|---|---|
| 2,238,624 | A | * | 4/1941 | Clark | 392/464 |
| 5,968,393 | A | * | 10/1999 | Demaline | 219/492 |
| 6,208,806 | B1 | * | 3/2001 | Langford | 392/464 |
| 8,245,669 | B2 | * | 8/2012 | Phillips et al. | 122/4 A |
| 2001/0009609 | A1 | * | 7/2001 | Bradenbaugh | 392/463 |
| 2003/0194228 | A1 | * | 10/2003 | Bradenbaugh | 392/463 |
| 2006/0124629 | A1 | * | 6/2006 | Valbh et al. | 219/492 |
| 2006/0222349 | A1 | * | 10/2006 | Sturm et al. | 392/463 |
| 2006/0283964 | A1 | * | 12/2006 | Garozzo | 236/46 R |
| 2007/0175883 | A1 | * | 8/2007 | Miu et al. | 219/400 |
| 2009/0001182 | A1 | * | 1/2009 | Siddaramanna et al. | 236/46 R |
| 2012/0060771 | A1 | * | 3/2012 | Brian et al. | 122/14.1 |
| 2012/0060829 | A1 | * | 3/2012 | DuPlessis et al. | 126/609 |
| 2012/0118989 | A1 | * | 5/2012 | Buescher et al. | 392/463 |
| 2013/0193221 | A1 | * | 8/2013 | Buescher et al. | 237/8 A |

OTHER PUBLICATIONS

Search record from IP.com, Feb. 26, 2014.*

* cited by examiner

*Primary Examiner* — Joseph M Pelham
(74) *Attorney, Agent, or Firm* — Global Patent Operation; Douglas D. Zhang

(57) ABSTRACT

A hot water heater includes a tank for storing water, one or more heating elements for selectively applying heat to the water in the tank, and a controller for controlling the heating elements, operative to automatically self-program control of the hot water heater to reduce energy consumption of the hot water heater based on usage data. The controller is operative to execute a learning algorithm that tracks usage data of the hot water heater based on one or more parameters.

20 Claims, 4 Drawing Sheets

SELF-PROGRAMMING WATER HEATER

BACKGROUND OF THE INVENTION

The subject matter disclosed herein relates generally to energy management, and more particularly to energy management of household consumer appliances, as well as other energy consuming devices and/or systems in a home environment.

One or more embodiments of the invention include particular application to a hot water heater. Basic hot water heaters generally include a water reservoir or tank, a heating element such as a gas burner or an electric heating element, and a thermostat that controls the heating element to maintain a set temperature of the water in the tank. In general, the temperature of the water is maintained at a relatively constant level, corresponding to a set-point of the thermostat, until hot water is needed. As hot water is dispensed from the tank, cold water is admitted, thereby lowering the temperature of the water. When the temperature drops below the set-point of the thermostat, the heating element is activated to raise the temperature of the water.

Commonly, a water heater is used only relatively infrequently. For example, hot water demand in a residential installation may be greatest in the morning and virtually non-existent during the day. Demand may then increase again in the evening. Conventional water heaters, however, work to maintain the set point temperature regardless of hot water demand. This results in wasted energy and increased costs for consumers.

BRIEF DESCRIPTION OF THE INVENTION

As described herein, the exemplary embodiments of the present invention overcome one or more disadvantages known in the art.

One aspect of the present invention relates to a hot water heater that includes a tank for storing water, one or more heating elements for selectively applying heat to the water in the tank, and a controller for controlling the one or more heating elements operative to automatically self-program control of the hot water heater to reduce energy consumption of the hot water heater based on usage data.

Another aspect of the present invention relates to a device for controlling one or more heating elements of a hot water heater. The device includes a controller for controlling one or more heating elements of a hot water heater operative to automatically self-program control of the hot water heater to reduce energy consumption of the hot water heater based on usage data, the controller including a real-time clock component and a learning algorithm that tracks usage data of the hot water heater based on one or more parameters, wherein the controller uses the usage data to generate a predictive model for future hot water usage, and wherein the controller uses the predictive model to automatically self-program control of the hot water heater.

Yet another aspect of the present invention relates to a method comprising the steps of controlling one or more heating elements to reduce energy consumption of the hot water heater based on usage data, wherein controlling one or more heating elements to reduce energy consumption comprises receiving usage data for the hot water heater via a water flow meter; communicating the usage data from the water flow meter to a controller device operative to execute a learning algorithm; executing the learning algorithm to track the usage data based on one or more parameters; using the usage data to generate a predictive model for future hot water usage; and automatically self-programming control of the hot water heater to reduce energy consumption.

These and other aspects and advantages of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not necessarily drawn to scale and, unless otherwise indicated, they are merely intended to conceptually illustrate the structures and procedures described herein.

DETAILED DESCRIPTION OF THE EXEMPLARY EMBODIMENTS OF THE INVENTION

Figure 1:
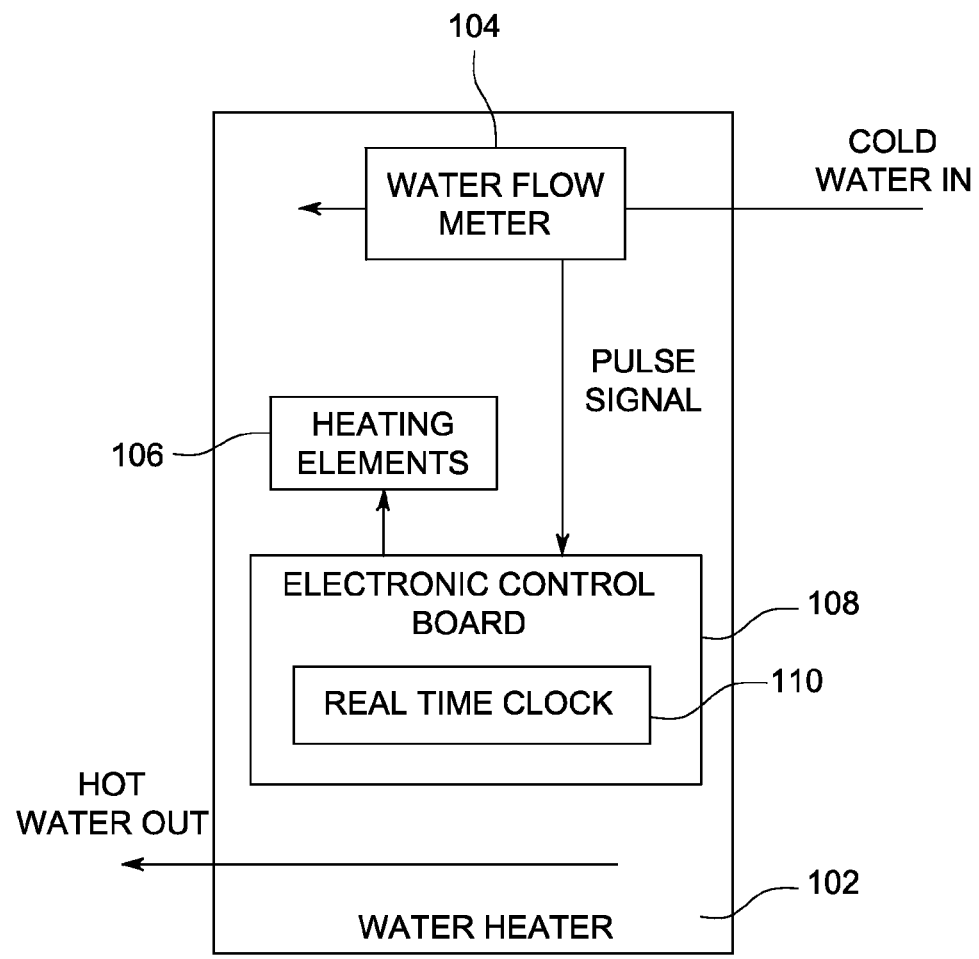
FIG. 1 presents self-programming hot water heater system architecture, in accordance with a non-limiting exemplary embodiment of the invention.

As described herein, one or more embodiments of the invention include techniques and apparatuses for an energy smart self-programming water heater.

As detailed herein, a hot water heater (for example, a microprocessor-controlled water heater) includes a controller in accordance with an illustrative embodiment of the present disclosure. The hot water heater also includes a reservoir or tank for storing water, and a heat source for heating the water stored in the reservoir. A supply line supplies water to the hot water heater (for example, from a municipal supply, well, etc.). A hot water outlet line supplies hot water from the heater to the pipes of a residence, for example, for supplying hot water to one or more plumbing fixtures.

In the illustrated embodiments, the specific details of hot water heater construction have been omitted. It will be appreciated, however, that the hot water heater can be any conventional hot water heater including an electric, gas, or hybrid hot water heater. Thus, the heat source can be an electric heating element, such as a resistive-type heating element, a gas heating element, such as a propane or natural gas burner, a heat pump type heating element, or any other type of heating element.

For example, a hybrid hot water heater, as can be implemented in connection with one or more embodiments of the invention, utilizes an electric heat pump for heating water along with one or more standard electric heating elements. The electric heat pump is the primary source of heat, and the one or more electric heating elements are used as supplemental heat sources in times of high hot water demand, for example, or when the heat pump alone is insufficient to heat the water.

Accordingly, one or more embodiments of the invention include a software algorithm whereby a water heater controller builds and maintains statistical tables representing hot water usage patterns for a particular consumer over a period of time and uses those usage patterns to reduce energy consumption and reduce electricity bills.

The usage patterns are used as the basis of a predictive model for predicting when hot water will most likely be needed. The water heater controller can then modify its heating algorithm to create timely hot water, for example, only consuming energy when hot water usage is anticipated.

Additionally, in systems where Time of Use (TOU) pricing information is available, the TOU information can be used in one or more embodiments of the invention to further modify the timing of the water heating. Specifically, in one or more embodiments of the invention, the water heater will modify the heating algorithm to reduce energy consumption at the more expensive price tiers.

As detailed herein, in one or more embodiments of the invention, a microprocessor-controlled water heater is placed in a learning mode whereby it tracks usage based on different parameters such as, for example, time of use (that is, when did the homeowner draw hot water?), volume of water drawn (that is, how much hot water was drawn?), and recovery time (that is, at those times when the unit was energized to maintain the set-point, how long did it take to recover?).

Using such information, the water heater controller can build a statistical table to be used as a predictive model for hot water use. By way of illustration, an example scenario might include the following: Based on the past 90 days of use, the hot water heater controller determines that there is a 0% chance that hot water will be drawn between 9:00 AM and 4:00 PM on Wednesdays. Based on the past 90 days of use, the hot water heater controller determines that there is an 85% chance that more than 20 gallons of hot water will be drawing between 7:00 PM and 9:00 PM on Mondays. Additionally, the controller has determined that it will take 120 minutes to reach the programmed set-point from the current temperature.

Using this information, the water heater controller can turn off the heating elements on Wednesdays at 9:00 AM and "coast" for several hours. In a similar fashion, the water heater controller will know to turn on the heating elements two hours before 7:00 PM on Mondays to ensure that hot water is available at 7:00 PM.

Also, in one or more embodiments of the invention, additional intelligence can be incorporated into the system by considering current and future energy pricing information that will be available through a smart energy profile price event cluster. For example, if the hot water heater controller determines that hot water will be needed at 6:00 PM, but energy prices will be inexpensive until 4:00 PM, one or more embodiments of the invention can include enabling the system to preheat the water to be finished at 4:00 PM. From 4:00 PM to 6:00 PM, when energy prices are more expensive, the water heater will only use additional energy to maintain the set-point.

As will be appreciated, a controller can be configured to carry out one or more of the described-herein functions at different times of the day, week, month, year, etc. For example, the controller can be programmable to perform at least one of the functions (for example, learning mode) at a user specified time. Also, in one or more embodiments of the invention, a user interface can be provided to enable the user to program the controller (for example, to control the occurrence and frequency of the system learning mode). By way of example, a button can be implemented on the water heater that will allow the user to turn the learning mode either on or off. This would not only enable the learning mode but also implement its predictive algorithms. The user interface can include one or more user inputs and a display for displaying data and/or settings to the user. Such user interface can be associated with the controller and/or water heater, or can be a separate device that is configured to communicate with the controller. For example, the user interface could be a display and keypad mounted to the hot water heater. Alternatively, the user interface could be a personal computer or a cell phone configured to communicate with the controller.

Additionally, in one or more embodiments of the invention, an energy management system can be incorporated as part of the hot water heater itself. Further, a system can also include a microprocessor, one or more sensors, as well as an integrated flow meter. A water flow measuring device can be used to measure water amounts being consumed (for example, at a home). A controller, such as a home energy manager, for example, is communicatively linked to the water flow measuring device of the system, which includes a memory for storing data and executable instructions for the corresponding techniques. Data is received from the water flow measuring device that includes an amount of water consumed from a cold water inlet pipe over a predetermined period of time. The data can be communicated from a communication module to the controller for processing. Also, in one or more embodiments of the invention, the data can be presented to the user or homeowner via a user display. The data is used to determine the amount of water being consumed, which is used in conjunction with separate and additional data from different periods of time in order to carry out a learning mode. In addition, the amount of water from a hot water outlet pipe can also be measured (and presented to the user via the display). Other information may also be measured (and presented) including, but not limited to the following: temperature of the hot water in the tank, energy and cost of heating the water in the tank.

In one or more embodiments of the invention, a water heating and storage system has an insulated tank for storing water and a flow meter integrated with the system. The tank can have a communication module that communicates the data provided from the flow meter to a central controller of a home network and also, for example, to other devices of the network. The flow meter is connected to a hot water outlet pipe and/or to a cold water inlet so that a total amount of hot water, a total amount of cold water, total water consumption, and a cost for heating is determined at the central controller for use in connection with one or more additional techniques detailed herein.

A communication module may be a wireless module or a wired module that communicates with an analog or digital signal to other devices within the home network and/or the controller. There are several ways to accomplish communication of data from the flow meters, including but not limited to power line carrier (PLC) (also known as power line communication), FM, AM SSB, WiFi, ZigBee, Radio Broadcast Data System, 802.11, 802.15.4, etc. The controller and other devices within the home network (for example, HVAC unit, programmable thermostat, user display device, etc.) may communicate in analog or digital format with the system directly therefore via a wired, optical and/or wireless connection, and the present disclosure is not limited to any one specific method for communicating data.

Accordingly, one or more embodiments of the invention include applying scheduling behavior to a hot water heater. Putting the water heater in a learning mode (in one or more embodiments of the invention, a user could press a button and put the system into learning mode), over time, the system would monitor the calls and the temperatures for high-demand periods of the day. For example, assume that over the course of a day, two people living in a house together customarily shower at different times (one in the morning and one at night). The system would learn that the main calls for heat are in the morning and in the evening, and then during the day it would learn that there is rarely a high demand or draw for heat, so the temperature could be dropped back during that period. In one or more embodiments of the invention, a time duration (how much history is considered) can be specified for calculating probabilities. As schedules change, the water heater would automatically adapt. For example, the system may be configured to always only consider the previous four weeks of data. There may, also, be instances when a user can opt to suspend learning mode (for example, during a vacation or abnormal schedule).

The amount of temperature drop can be, for example, a percentage value of the current user set-point. The algorithm of one or more embodiments of the invention includes learning and making the determination of when the temperature needs to be changed, and then how much the temperature needs to be changed.

In one or more embodiments of the invention, the system statistically logs data based on time of day (and, if it's available, volume of water used) over some period of time. The longer the period of time, the potentially more accurate the resulting determined patterns will be. In identifying patterns, one or more embodiments of the invention can, for example, draw a box around acceptable/statistically significant patterns (for example, there is a 90% chance that the user will need hot water on a Thursday evening). By way of example, a percentage threshold point can be included as a static feature in one or more embodiments of the invention, or options can be presented to the user for selection (such as, for example, a low-medium-high (degree of certainty that hot water will be available based on usage data) option), and the user/consumer can make the choice based on his or her own heat certainty versus cost savings considerations.

Also, as described above, in one or more embodiments of the invention, operation can be controlled based upon the price of electricity. By way of example, if every Thursday evening a consumer knows that he or she will need hot water by approximately 7:00 PM, the system can vary the timing and duration of heating operations and what is done in the hours leading up to that designated time to determine the most cost-efficient way to reach the set-point. For example, such considerations can include determining whether to use electric heat during the high-price period right before the designated time, or whether to run the heat pump for two hours before the designated time in order to reach the set-point.

According to one or more embodiments of the invention, the decision for using resistance heat and/or heat pump and when to use it can be determined by the water heater control algorithm. Input variables can include water inlet temperature, set point, current tank temperature, time until water is needed and price. Additionally, a price threshold can be user selectable or can be pre-configured in the system (for example, for a price tier greater than 2, the water heater will attempt to heat the water using the most efficient electricity consumption).

Attention should now be paid to FIG. 1. FIG. 1 presents self-programming hot water heater system architecture, in accordance with a non-limiting exemplary embodiment of the invention. By way of illustration, FIG. 1 depicts a water heater 102, which includes a water flow meter 104, heating elements 106 and an electronic controller 108, which includes a real-time clock component 110. As illustrated, cold water enters the tank of the water heater any time that hot water is extracted, and the water flow meter 104 provides a pulse output to the electronic controller 108 as each unit (for example, gallon, liter, etc.) of water flows. Further, as additionally detailed herein, the controller 108 is configured to execute a learning algorithm to generate statistical tables for use by a predictive model for controlling the heating element(s). As also depicted in FIG. 1, hot water is output from the water heater.

Additionally, in one or more embodiments of the invention, inputs into such a system as depicted in FIG. 1 can include time (via, for example, the real-time clock 110), a flow meter pulse (in connection with water consumption), one or more temperature sensors (measuring water temperature) and a set-point (for example, as designated by a user). Control functions can include temperature regulation, as well as execution of a learning algorithm and generation of a predictive model. For example, the user selectable temperature range can be manufacturer defined (typically on the order of 100-140 degrees F.), and there can be a hysteresis band for maintaining the temperature (usually a couple of degrees above or below the user set-point). Further, output of such a system can include manipulation of one or more heating elements.

Figure 2:
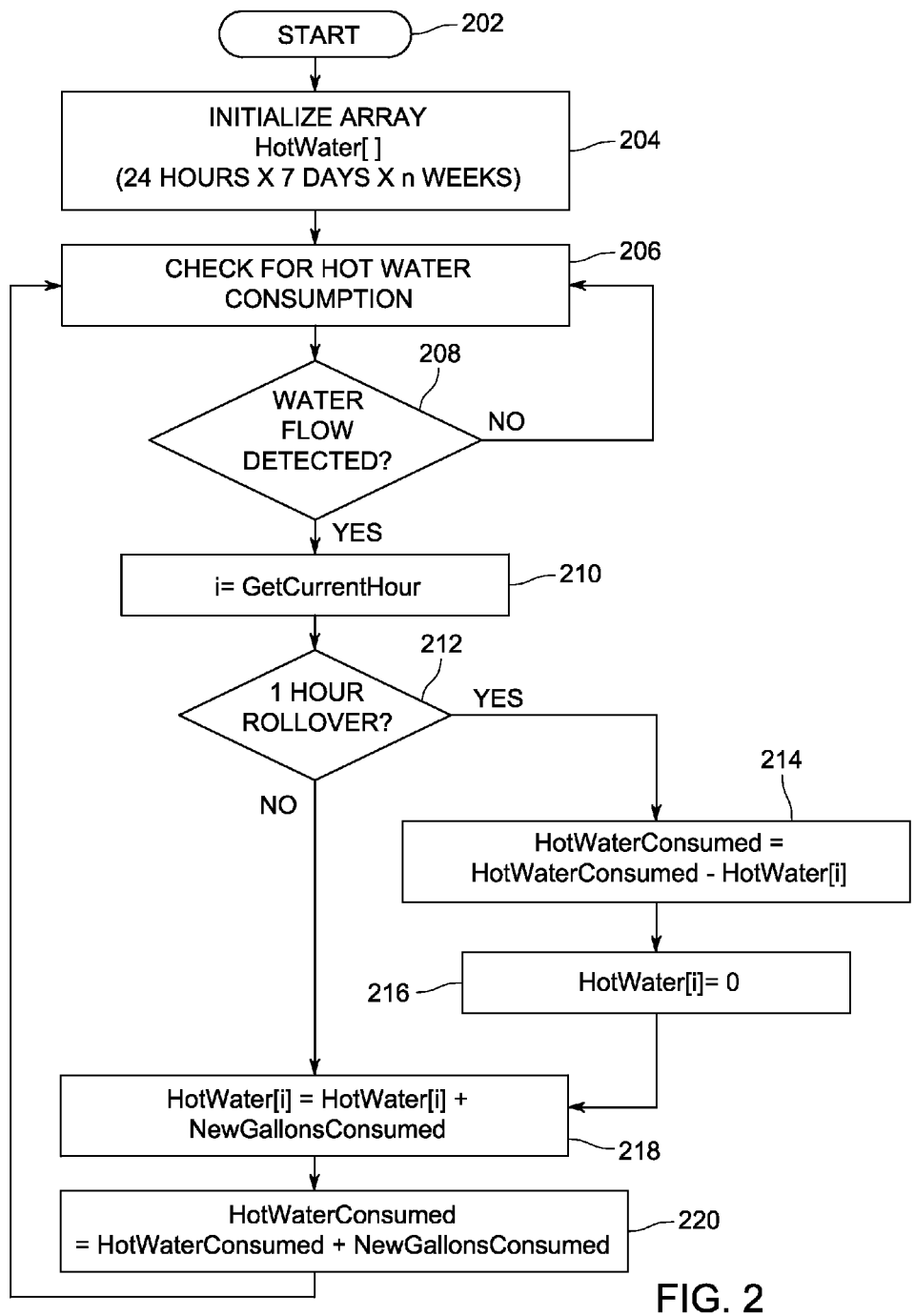
FIG. 2 is a flow chart of a method for implementing a learning mode to build a statistical table, in accordance with a non-limiting exemplary embodiment of the invention.

FIG. 2 is a flow chart of a method for implementing a learning algorithm to build a statistical table representing a hot water usage profile, for use by a predictive model hereinafter described with reference to FIG. 3, in accordance with a non-limiting exemplary embodiment of the invention. As is to be appreciated, the particular measurements (for example, gallons, hours, weeks) used in the example of FIG. 2 (as well as FIG. 3) are merely for illustrative purposes, and other acceptable measurements and measurement values can be used in one or more embodiments of the invention.

Step 202 includes starting the process. Step 204 includes initializing a hot water array (denoted, for example, as HotWater [ ]). This is an array for holding hot water consumption values. By way of example, each element of the array can track a one-hour block of time within a specific week. In the long term, one or more embodiments of the invention can include populating this array with data from the most recent n number of weeks. This implies that older aggregate data will eventually be purged and replace by newer data as time moves forward. Accordingly, the algorithm used in one or more embodiments of the invention is based on an n-week rolling average.

Step 206 includes checking for hot water consumption. As described herein, a water flow meter exists in the system that is able to track water consumption, for example, with at least one gallon resolution and make this data available to the algorithm. Step 208 includes determining if a water flow is detected. If no flow is detected, then the techniques return to step 206. If a flow is detected, then the techniques proceed to step 210, which includes obtaining an index into the hot water array that points to the current hour (denoted, for example, as i=GetCurrentHour). One or more embodiments of the invention include tracking consumption hour-by-hour. GetCurrentHour will return a value between 0 and 24×7×(n−1), where n is the number of weeks that hot water consumption is being tracked.

Step 212 includes determining if there is a one-hour rollover. A one-hour rollover means that real time has passed the top of a new hour. For example, between 1:55 AM and 2:05 AM, a one-hour rollover happens at 2:00. This metric is used in the algorithm to determine when it is time to do statistical table housekeeping. The oldest hour of historical data is purged at the top of each new hour to make room for the new hour of data that will be added in the next 60 minutes. If there is a one-hour rollover, the techniques proceed to step 214, which includes purging data from n weeks ago (denoted, for example, as HotWaterConsumed=HotWaterConsumed−HotWater[i]). This ensures that the algorithm is operating based on recent data. Accordingly, one or more embodiments of the invention can include subtracting the total gallons consumed from this hour n weeks ago from the running total. Further, step 216 includes initializing the array element back to zero (denoted, for example, as HotWater[i]=0). The data has been purged.

From step 216 as well as from step 212 if there is not a one-hour rollover, the techniques proceed to step 218, which includes adding new gallons of consumption to the bucket for the current hour (denoted, for example, as HotWater[i]=HotWater[i]+NewGallonsConsumed). Additionally, step 220 includes adding new gallons to the bucket for total water consumed this week (denoted, for example, as HotWaterConsumed=HotWaterConsumed+NewGallonsConsumed). Subsequent to step 220, the techniques can return to step 206.

Figure 3:
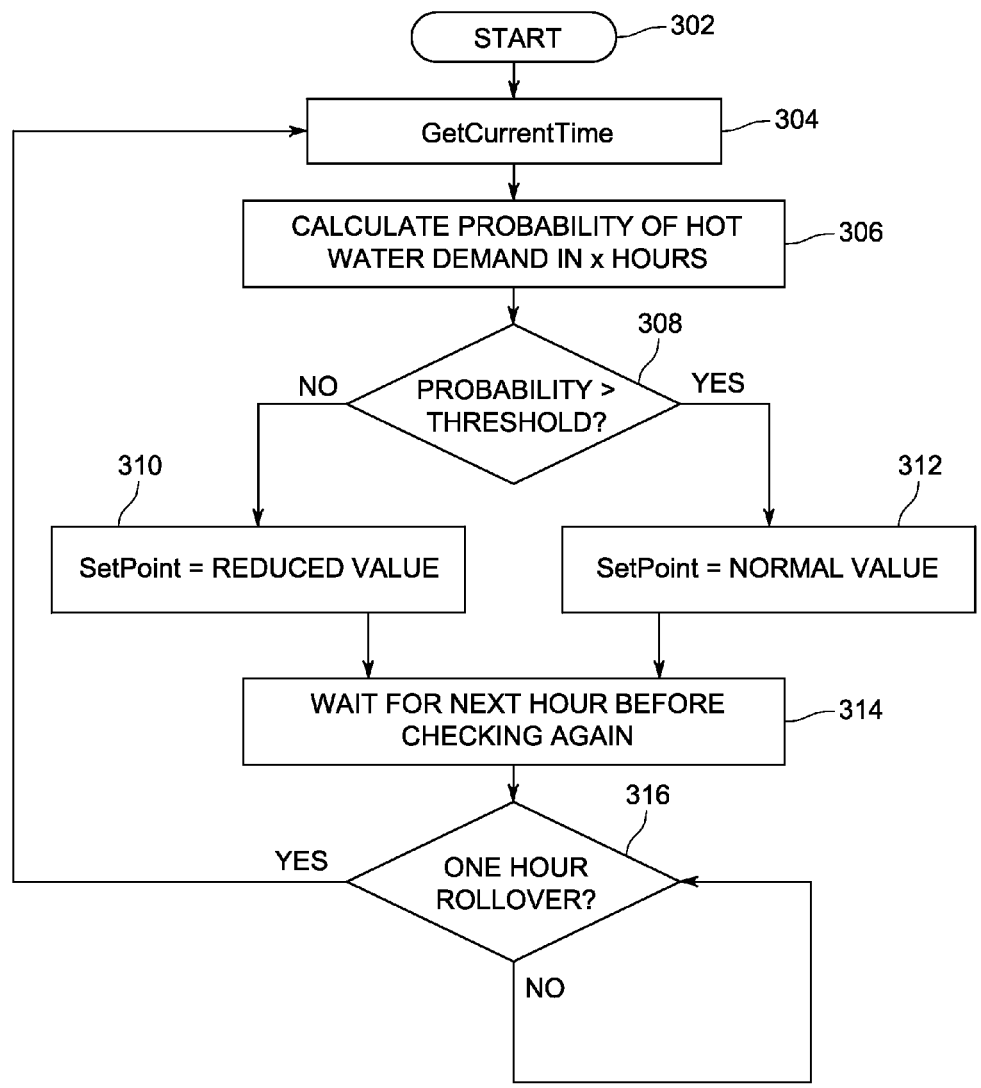
FIG. 3 is a flow chart of a method for implementing a predictive model for hot water consumption, in accordance with a non-limiting exemplary embodiment of the invention.

FIG. 3 is a flow chart of a method for implementing a predictive model for hot water consumption, using the data stored in the statistical table described with reference to FIG. 2, in accordance with a non-limiting exemplary embodiment of the invention. Step 302 includes starting the process. Step 304 includes obtaining the current time (denoted, for example, as GetCurrentTime). The predictive model works by knowing the current time and looking into the future to determine if there is a probability of hot water demand based on historical consumption patterns.

Step 306 includes calculating a probability of hot water demand in x hours. The probability function can include, for example, the following. Let t=the current hour of a given week. Let x=an integer number of hours in the future relative to t. Let n=the number of weeks for which the learning algorithm tracks usage. Let T=the total sum of hot water consumed in the past n weeks. Let G=the sum of gallons of hot water consumed at hour (t+x) across n weeks. Accordingly, the probability of hot water demand at time (t+x)=G/T.

Step 308 includes determining if the probability is greater than a certain threshold. The threshold value at which the water heater should reduce or increase its set-point can be chosen from a predetermined range by the consumer, or it can be fixed as part of the system design. The threshold value is used to tune the system between the opposite extremes of convenience and cost. For example, if the threshold is set too low, then the system will react by producing hot water when there is a very low probability of hot water demand. This will cost the consumer more, but they will likely always have hot water. If the threshold is set too high, the system will create hot water only when demand is statistically guaranteed. This will save the consumer money, in that their system will turn on less frequently, but they run a larger risk of not having hot water at certain times. The user interface, in one embodiment of the invention, can include a "savings vs. comfort" adjustment that enables the consumer to select from a range of values for the threshold from low for assurance of hot water when needed to high for cost savings with risk that hot water may not be available at a particular time. If the probability is greater than the threshold, the set-point=a normal value, as noted in step 310. If the probability is not greater than the threshold, the set-point=a reduced value, as noted in step 312.

Further, step 314 includes waiting for a next hour before checking again (that is, re-checking the determination as to whether probability is greater than the threshold). Additionally, step 316 includes determining if there is a one-hour rollover. If there is a one-hour rollover, the techniques return to step 304.

One advantage that may be realized in the practice of some embodiments of the described systems and techniques is using available microprocessor power to enhance the functions of the water heater and save energy.

Further, given the discussion thus far, it will be appreciated that, in general terms, an exemplary apparatus, according to one or more embodiments of the invention, includes a hot water heater (for example, an electric water heater, a hybrid-electric water heater, or a microprocessor-controlled water heater) that can include a tank for storing water, one or more heating elements for selectively applying heat to the water in the tank, and a controller (which can be communicatively connected with a home energy manager device) for controlling the heating elements to automatically self-program the hot water heater to reduce energy consumption of the hot water heater based on usage data.

As described herein, such an example apparatus can also include a water flow meter that provides information (for example, a pulse output) to the controller as each unit of water flows through the tank. Additionally, the controller includes a real-time clock component, as well as a learning algorithm. The learning algorithm tracks usage data of the hot water heater based on one or more parameters (such as, for example, time of use, volume of water drawn, recovery time, price of electricity, etc.). When price of electricity (for example, Time of Use (TOU) electricity pricing information) is used as a usage parameter, one or more embodiments of the invention can include facilitating the controller to further reduce energy consumption at a more expensive price tier.

Additionally, as also detailed herein, the controller uses the usage data to build a statistical table to be used as a predictive model for future hot water usage. Also, such an example apparatus can further include a user interface for programming the controller.

As also detailed herein, one or more embodiments of the invention include a method for operating a hot water heater via automatically self-programming the hot water heater controller, in accordance with the figures and corresponding descriptions herein.

Figure 4:
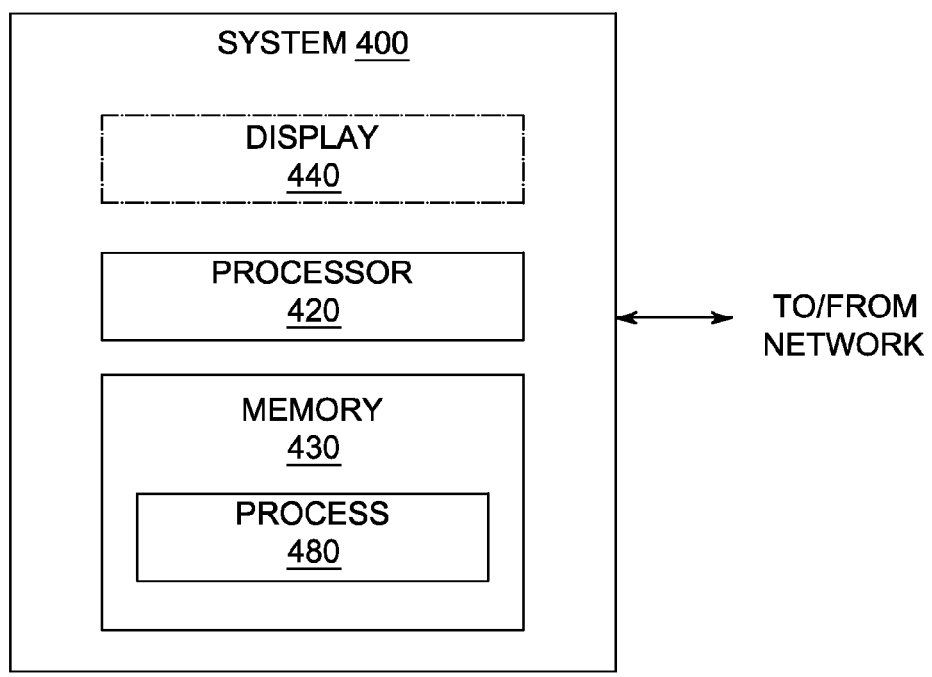
FIG. 4 is a block diagram of an exemplary computer system useful in connection with one or more embodiments of the invention.

Aspects of the invention (for example, a controller, electronic control board (such as component 110 in FIG. 1) or a workstation or other computer system to carry out design methodologies) can employ hardware and/or hardware and software aspects. Software includes but is not limited to firmware, resident software, microcode, etc. FIG. 4 is a block diagram of a system 400 that can implement part or all of one or more aspects or processes of the invention. As shown in FIG. 4, memory 430 configures the processor 420 to implement one or more aspects of the methods, steps, and functions disclosed herein (collectively, shown as process 480 in FIG. 4). Different method steps could theoretically be performed by different processors. The memory 430 could be distributed or local and the processor 420 could be distributed or singular. The memory 430 could be implemented as an electrical, magnetic or optical memory, or any combination of these or other types of storage devices. It should be noted that if distributed processors are employed (for example, in a design process), each distributed processor that makes up processor 420 generally contains its own addressable memory space. It should also be noted that some or all of computer system 400 can be incorporated into an application-specific or general-use integrated circuit. For example, one or more method steps (for example, such as those detailed herein) could be implemented in hardware in an application-specific integrated circuit (ASIC) rather than using firmware. Display 440 is representative of a variety of possible input/output devices.

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a processor or other computer system, to carry out all or some of the steps to perform the methods or create the apparatuses discussed herein. A computer-usable medium may, in general, be a recordable medium (for example, floppy disks, hard drives, compact disks, EEPROMs, or memory cards) or may be a transmission medium (for example, a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). As used herein, a tangible computer-readable recordable storage medium is intended to encompass a recordable medium, examples of which are set forth above, but is not intended to encompass a transmission medium or disembodied signal.

The computer system can contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the invention can make use of computer technology with appropriate instructions to implement method steps described herein.

Accordingly, it will be appreciated that one or more embodiments of the present invention can include a computer program comprising computer program code means adapted to perform one or all of the steps of any methods or claims set forth herein when such program is run on a computer, and that such program may be embodied on a computer readable medium. Further, one or more embodiments of the present invention can include a computer comprising code adapted to cause the computer to carry out one or more steps of methods or claims set forth herein, together with one or more apparatus elements or features as depicted and described herein.

It will be understood that processors or computers employed in some aspects may or may not include a display, keyboard, or other input/output components. In some cases, an interface is provided.

Thus, while there have shown and described and pointed out fundamental novel features of the invention as applied to exemplary embodiments thereof, it will be understood that various omissions and substitutions and changes in the form and details of the devices illustrated, and in their operation, may be made by those skilled in the art without departing from the spirit of the invention. Moreover, it is expressly intended that all combinations of those elements and/or method steps which perform substantially the same function in substantially the same way to achieve the same results are within the scope of the invention. Furthermore, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hot water heater comprising:
   a tank for storing water;
   one or more heating elements for selectively applying heat to the water in the tank; and
   a control system comprising a controller for controlling the one or more heating elements and one or more devices to collect water usage data, said controller being configured to automatically self-program control of the hot water heater to reduce energy consumption of the hot water heater based on the usage data,
   wherein the controller is configured to:
      selectively operate in a learning mode to build a statistical table representing a hot water usage profile using a learning algorithm responsive to input at a user interface during operation of the hot water heater;
      determine a first time period of predicted hot water usage based at least in part on the hot water usage profile, the first time period being associated with a first energy price tier; and
      control the one or more heating elements so as to heat the water in the tank at a second time period prior to the first time period, the second time period being associated with a second energy price tier lower than the first energy price tier.

2. The hot water heater of claim 1, further comprising a water flow meter operative to provide water usage information to the controller.

3. The hot water heater of claim 1, wherein the controller comprises a real-time clock component.

4. The hot water heater of claim 1, wherein the controller is configured to execute the learning algorithm.

5. The hot water heater of claim 4, wherein the learning algorithm tracks usage data of the hot water heater based on one or more parameters.

6. The hot water heater of claim 5, wherein the controller uses the usage data to build a statistical table to be used as a predictive model for future hot water usage.

7. The hot water heater of claim 5, wherein the one or more parameters comprise at least one of time of use, volume of water drawn, recovery time and price of electricity.

8. The hot water heater of claim 7, wherein use of the price of electricity as a usage parameter comprises facilitating the controller to further reduce energy consumption at a more expensive price tier.

9. The hot water heater of claim 1, wherein the controller is communicatively connected with a home energy manager device.

10. The hot water heater of claim 1, wherein the hot water heater comprises one of an electric water heater, a hybrid-electric water heater, and a microprocessor-controlled water heater.

11. The hot water heater of claim 1, wherein the user interface is for programming the controller.

12. A device for controlling one or more heating elements of a hot water heater, comprising:
   a controller for controlling the one or more heating elements of the hot water heater to automatically self-program control of the hot water heater to reduce energy consumption of the hot water heater based on usage data, the controller comprising:
a real-time clock component; and
a learning algorithm that tracks the usage data of the hot water heater based on one or more parameters, wherein the controller uses the usage data to generate a predictive model for future hot water usage, and wherein the controller uses the predictive model to automatically self-program control of the hot water heater,
wherein automatically self-programming control of the hot water heater comprises the controller:
selectively operating in a learning mode to build a statistical table representing a hot water usage profile using the learning algorithm responsive to input at a user interface during operation of the hot water heater;
determining a first time period of predicted hot water usage based at least in part on the hot water usage profile, the first time period being associated with a first energy price tier; and
controlling the one or more heating elements so as to heat the water in the hot water heater at a second time period prior to the first time period, the second time period being associated with a second energy price tier lower than the first energy price tier.

13. The device of claim 12, wherein the one or more parameters comprise at least one of time of use, volume of water drawn, recovery time and price of electricity.

14. The device of claim 13, wherein using the price of electricity as a usage parameter comprises facilitating the controller to further reduce energy consumption at a more expensive price tier.

15. The device of claim 12, wherein the controller is communicatively connected with a home energy manager device.

16. The device of claim 12, wherein the user interface is for programming the controller.

17. A method for operating a hot water heater, the method comprising:
controlling one or more heating elements to reduce energy consumption of the hot water heater based on usage data, wherein controlling one or more heating elements to reduce energy consumption comprises:
executing a learning algorithm to track the usage data based on one or more parameters;
using the usage data to generate a predictive model for future hot water usage; and
automatically self-programming to control the hot water heater to reduce energy consumption based on the predictive model,
wherein automatically self-programming to control the hot water heater comprises:
selectively operating in a learning mode to build a statistical table representing a hot water usage profile using the learning algorithm responsive to input at a user interface during operation of the hot water heater;
determining a first time period of predicted hot water usage based at least in part on the hot water usage profile, the first time period being associated with a first energy price tier; and
controlling the one or more heating elements so as to heat the water in the hot water heater at a second time period prior to the first time period, the second time period being associated with a second energy price tier lower than the first energy price tier.

18. The method of claim 17, wherein the usage data is received from a water flow meter.

19. The method of claim 17, wherein the one or more parameters comprise at least one of time of use, volume of water drawn, recovery time and price of electricity.

20. The method of claim 19, wherein using the price of electricity as a usage parameter comprises facilitating a controller device to further reduce energy consumption at a more expensive price tier.

\* \* \* \* \*